US009482350B2

(12) United States Patent
Ishigaki et al.

(10) Patent No.: US 9,482,350 B2
(45) Date of Patent: Nov. 1, 2016

(54) RADICAL-RESISTANT GATE VALVE

(71) Applicant: SMC CORPORATION, Chiyoda-ku (JP)

(72) Inventors: Tsuneo Ishigaki, Kitakatsushikagun (JP); Hiromi Shimoda, Noda (JP); Hiroshi Ogawa, Okegawa (JP)

(73) Assignee: SMC CORPORATION, Chiyoda-ku (JP)

( * ) Notice: Subject to any disclaimer, the term of this patent is extended or adjusted under 35 U.S.C. 154(b) by 0 days.

(21) Appl. No.: 14/721,422

(22) Filed: May 26, 2015

(65) Prior Publication Data
US 2015/0369374 A1    Dec. 24, 2015

(30) Foreign Application Priority Data

Jun. 5, 2014   (JP) ................... 2014-117035

(51) Int. Cl.
*F16K 3/18*  (2006.01)
*F16K 3/02*  (2006.01)

(52) U.S. Cl.
CPC ............ *F16K 3/184* (2013.01); *F16K 3/0281* (2013.01)

(58) Field of Classification Search
CPC .... F16K 3/0227; F16K 3/0218; F16K 3/184; F16K 3/0281
USPC .......................... 251/193, 326–329, 203–204
See application file for complete search history.

(56) References Cited

U.S. PATENT DOCUMENTS

| 2,002,672 | A | * | 5/1935 | Melott | F16K 15/02 251/332 |
|---|---|---|---|---|---|
| 3,362,680 | A | * | 1/1968 | Weiss | F16K 1/42 251/360 |
| 3,631,894 | A | * | 1/1972 | Frantz | F02N 7/08 137/630.15 |
| 5,172,722 | A | * | 12/1992 | Nishimura | F16K 39/024 137/599.16 |
| 5,579,718 | A | * | 12/1996 | Freerks | F16K 51/02 118/733 |
| 6,390,449 | B1 | * | 5/2002 | Ishigaki | F16K 51/02 251/193 |
| 6,474,622 | B2 | * | 11/2002 | Ito | F16K 51/02 251/158 |
| 6,494,229 | B2 | * | 12/2002 | Kajitani | F16K 1/38 137/530 |
| 7,066,443 | B2 | * | 6/2006 | Ishigaki | F16K 3/10 251/195 |
| 7,798,467 | B2 | * | 9/2010 | Sakurai | F16K 31/122 251/335.3 |
| 2005/0279956 | A1 | * | 12/2005 | Berger | F16K 1/44 251/77 |
| 2006/0226388 | A1 | * | 10/2006 | Hiroki | F16K 51/02 251/204 |
| 2012/0055400 | A1 | * | 3/2012 | Hiroki | F16K 1/24 251/326 |

FOREIGN PATENT DOCUMENTS

| JP | 2002-217137 | 8/2002 |
|---|---|---|
| JP | 2006-005008 | 1/2006 |

* cited by examiner

*Primary Examiner* — John Bastianelli
(74) *Attorney, Agent, or Firm* — Oblon, McClelland, Maier & Neustadt, L.L.P.

(57) ABSTRACT

A gate valve that can suppress the deterioration of a seal member due to radicals is provided, and the seal member in the gate valve can be prevented from coming off a dovetail groove. A seal groove for attaching a seal member is formed by a first groove portion that has a rectangular cross-section and a second groove portion that is provided in the bottom wall of the first groove portion and that has a dovetail groove-like cross-section. The seal member is held in the second groove portion with part thereof protruded into the first groove portion. A valve seat that is inserted into and pulled out of the seal groove to be brought into and out of contact with the seal member is protruded from the inner surface of a partition wall in which a gate opening is provided.

4 Claims, 4 Drawing Sheets

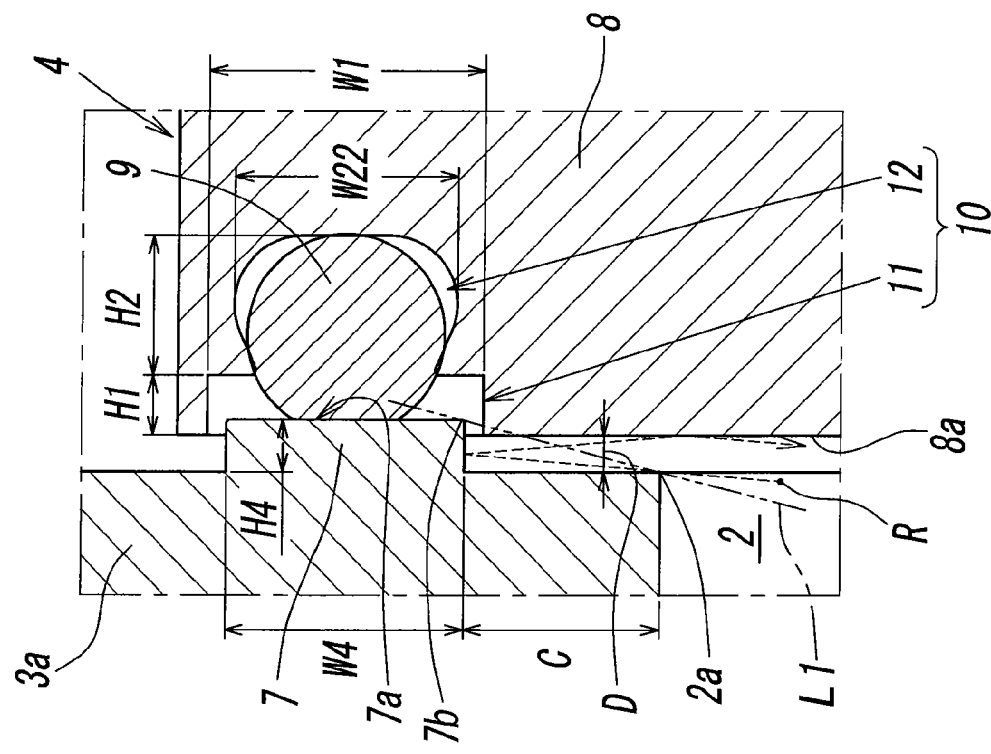
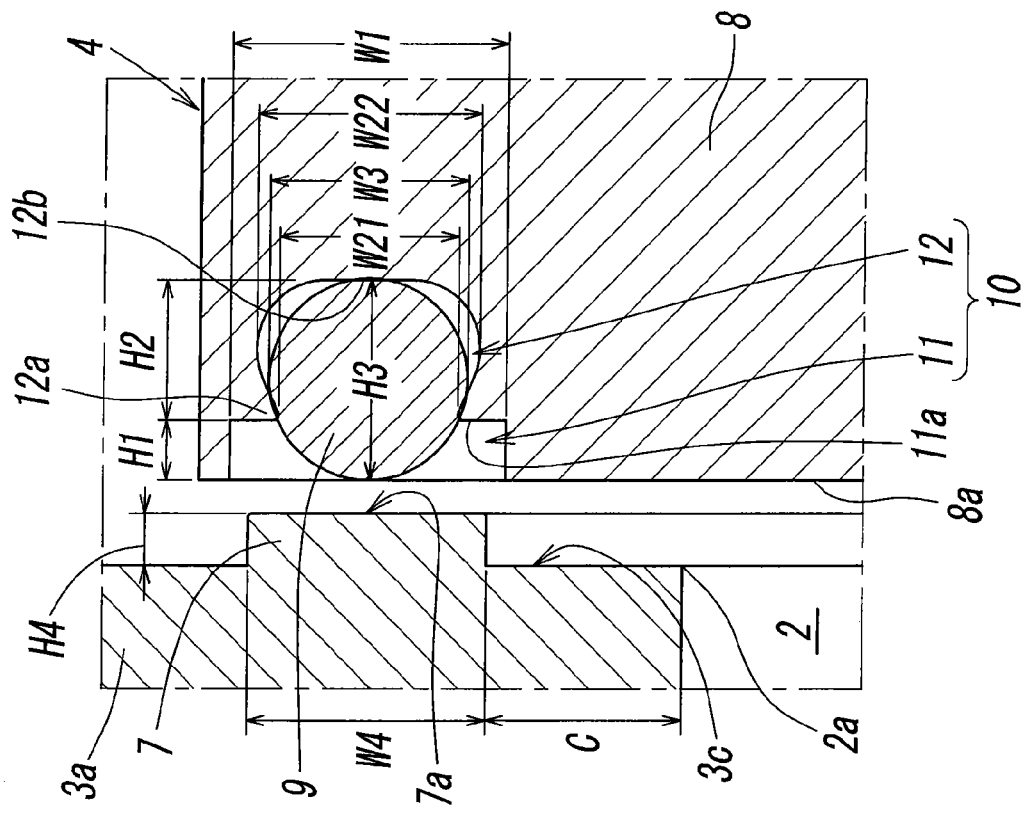

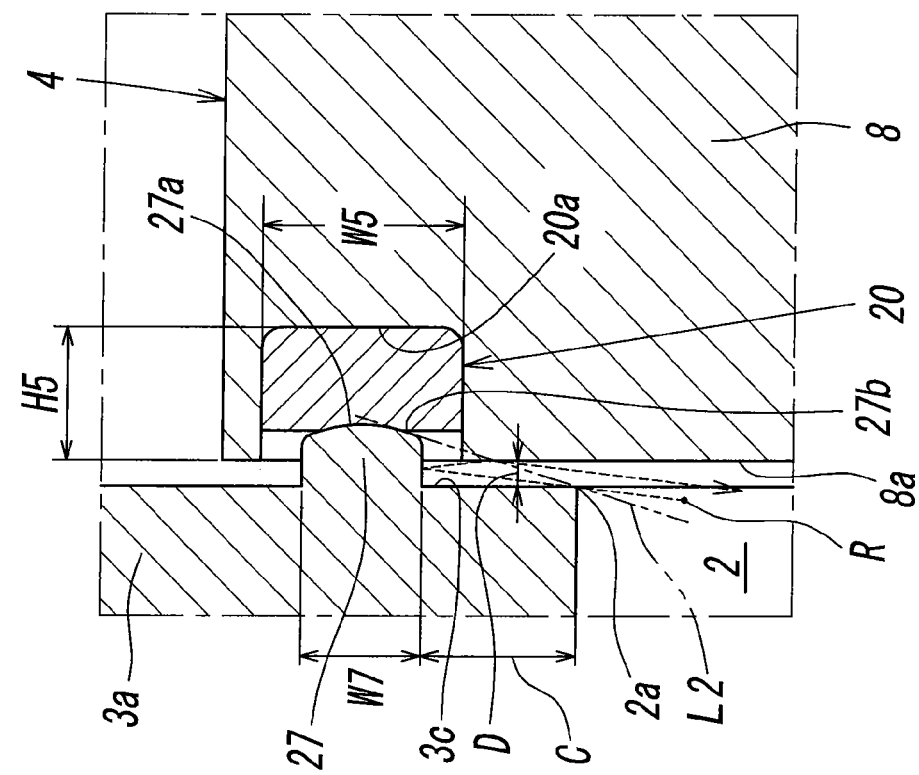
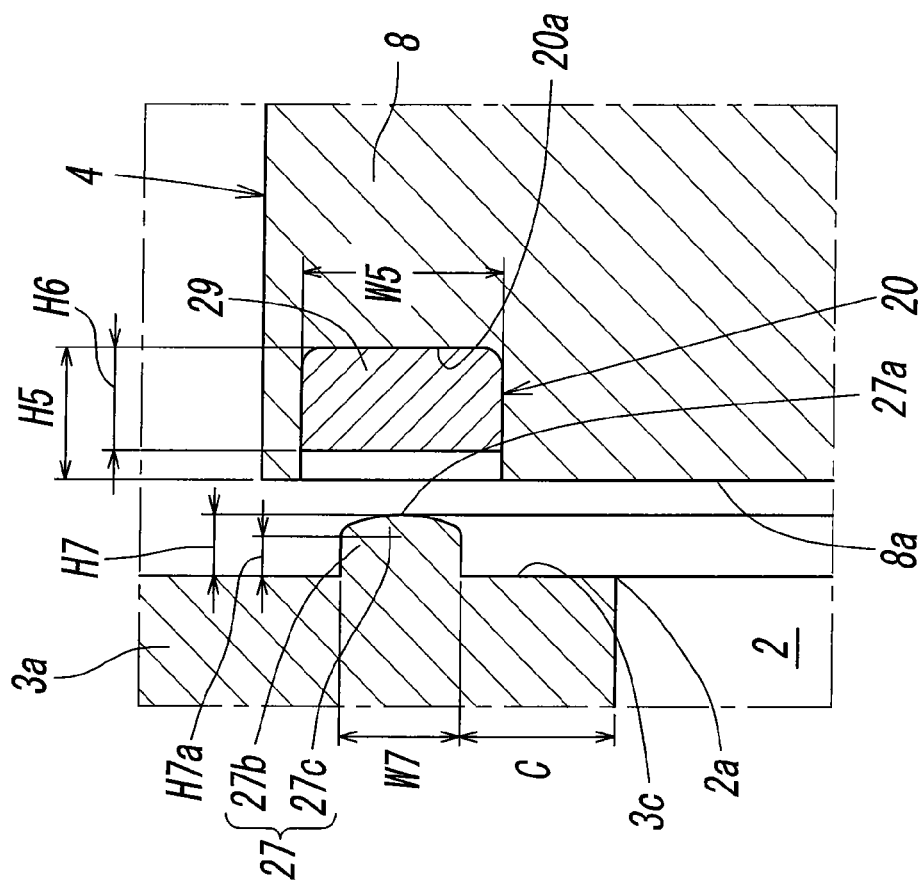
FIG.4A
FIG.4B

RADICAL-RESISTANT GATE VALVE

TECHNICAL FIELD

The present invention relates to a gate valve that is provided between a process chamber and a transfer chamber in a processing apparatus such as a semiconductor processing apparatus or a liquid crystal processing apparatus and that is used for opening and closing a gate opening connecting the process chamber and the transfer chamber.

BACKGROUND ART

A gate valve is used, for example, in a processing apparatus that performs processing such as etching using a radical of fluorine (F) or oxygen (O) on a workpiece such as a semiconductor wafer or a liquid crystal substrate in a process chamber that is evacuated and into which process gas is introduced, and has a role in opening the gate opening when the workpiece is carried in and out of the chamber and hermetically closing the gate opening during the processing in the chamber. In general, this type of gate valve is configured such that a seal member such as an O-ring is attached in an annular dovetail groove formed in a valve plate, and the gate opening is opened and closed by bringing the seal member into and out of contact with a valve seat provided around the gate opening.

Now, it is known that if, in a gate valve having such a configuration, radicals generated in a hermetically closed chamber during processing act on the seal member through a gap between the valve plate and a side wall in which the gate opening is provided, the deterioration of the seal member is hastened, and particles are generated. Attempts to suppress the deterioration of the seal member due to radicals include PTL 1 and PTL 2.

On the other hand, in order to achieve more reliable sealing of the gate opening, measures to more reliably prevent the seal member from coming off a dovetail groove are also desirable.

CITATION LIST

Patent Literature

[PTL 1] Japanese Unexamined Patent Application Publication No. 2002-217137
[PTL 2] Japanese Unexamined Patent Application Publication No. 2006-5008

SUMMARY OF INVENTION

Technical Problem

The technical object of the present invention is to provide a gate valve in which the deterioration of a seal member due to radicals can be suppressed, and the seal member can be prevented from coming off a dovetail groove.

Solution to Problem

To solve the above technical problem, the gate valve according to the present invention includes a gate opening provided in a partition wall in order to connect to a process chamber, and a valve plate coming into and out of contact with the gate opening in order to open and close the gate opening. A valve seat is formed around the gate opening in the partition wall, and the valve plate has a valve plate body having a seal groove at a position corresponding to the valve seat and a seal member attached in the seal groove. The entirety of the seal member is housed in the seal groove. The valve seat is protruded from the inner surface of the partition wall toward the valve plate direction, has at the distal end thereof a valve seat surface with which the seal member is brought into and out of contact, and has a width smaller than the opening width of the seal groove. When the valve plate is at a hermetically closing position of the gate opening, the distal end part of the valve seat is inserted in the seal groove, and the valve seat surface hermetically abuts against the seal member in the seal groove.

In a first embodiment of the gate valve according to the present invention, the seal groove is formed by a first groove portion that opens on a seal surface of the valve plate body opposed to the gate opening and that has a groove width that is uniform in the depth direction, and a dovetail groove-like second groove portion that opens substantially in the center of the bottom wall of the first groove portion and that has an opening width smaller than the groove width of the first groove portion, and the seal member has a width larger than the opening width of the second groove portion and a thickness larger than the depth of the second groove portion, and is attached in the second groove portion with part thereof protruded into the first groove portion.

It is preferable that the surface of part of the seal member that is protruded into the first groove portion be formed so as to be a convex curved surface, and the valve seat surface be formed so as to be a flat surface.

It is preferable that the groove width of the first groove portion be smaller than or equal to twice the opening width of the second groove portion.

In a second embodiment of the gate valve according to the present invention, the seal groove is formed of a single recessed groove that opens on a seal surface of the valve plate body opposed to the gate opening and that has a groove width that is uniform in the depth direction, and the seal member is attached in the recessed groove.

It is preferable that a surface of the seal member opposed to the valve seat surface be formed so as to be a flat surface, and the valve seat surface be formed so as to be a convex curved surface.

In the gate valve according to the present invention, it is preferable that, when the valve plate is at the hermetically closed position of the gate opening, a straight line in contact with both an opening edge of the gate opening on the inner side of the partition wall and the surface of the valve seat be in contact with the valve plate body or cross it between these contact points.

Advantageous Effects of Invention

Thus, the gate valve according to the present invention is configured such that the entire seal member is always housed in the seal groove, and, when the gate opening is hermetically closed, the valve seat protruded from the inner surface of the partition wall is inserted in the seal groove, and hermetically abuts against the seal member in the seal groove. Therefore, when the gate opening is hermetically closed, the seal member is surrounded by the seal groove and the valve seat, and most of the radicals entering the space between the valve plate and the partition wall from the gate opening side repeatedly collide with the valve plate, the partition wall, or the valve seat and are prevented from reaching the seal member. As a result, the deterioration of the seal member due to radicals can be suppressed. In addition, at the same time, the seal member can also be prevented from coming off the seal groove.

In particular, according to the gate valve according to claim 6, radicals can be prevented from directly reaching the seal member through the gate opening, and therefore the deterioration of the seal member due to radicals can be prevented more reliably.

BRIEF DESCRIPTION OF DRAWINGS

FIG. 3A is an enlarged view of part A in FIG. 1, and FIG. 3B is an enlarged view of part B in FIG. 2.

FIGS. 4A and 4B include enlarged sectional views of the main part of a gate valve according to a second embodiment of the present invention, FIG. 4A shows a state where a valve plate is at an intermediate position where the valve plate is vertically separated from a gate opening, and FIG. 4B shows a state where the valve plate is at a hermetically closing position where the valve plate hermetically closes the gate opening.

DESCRIPTION OF EMBODIMENTS

Figure 1:
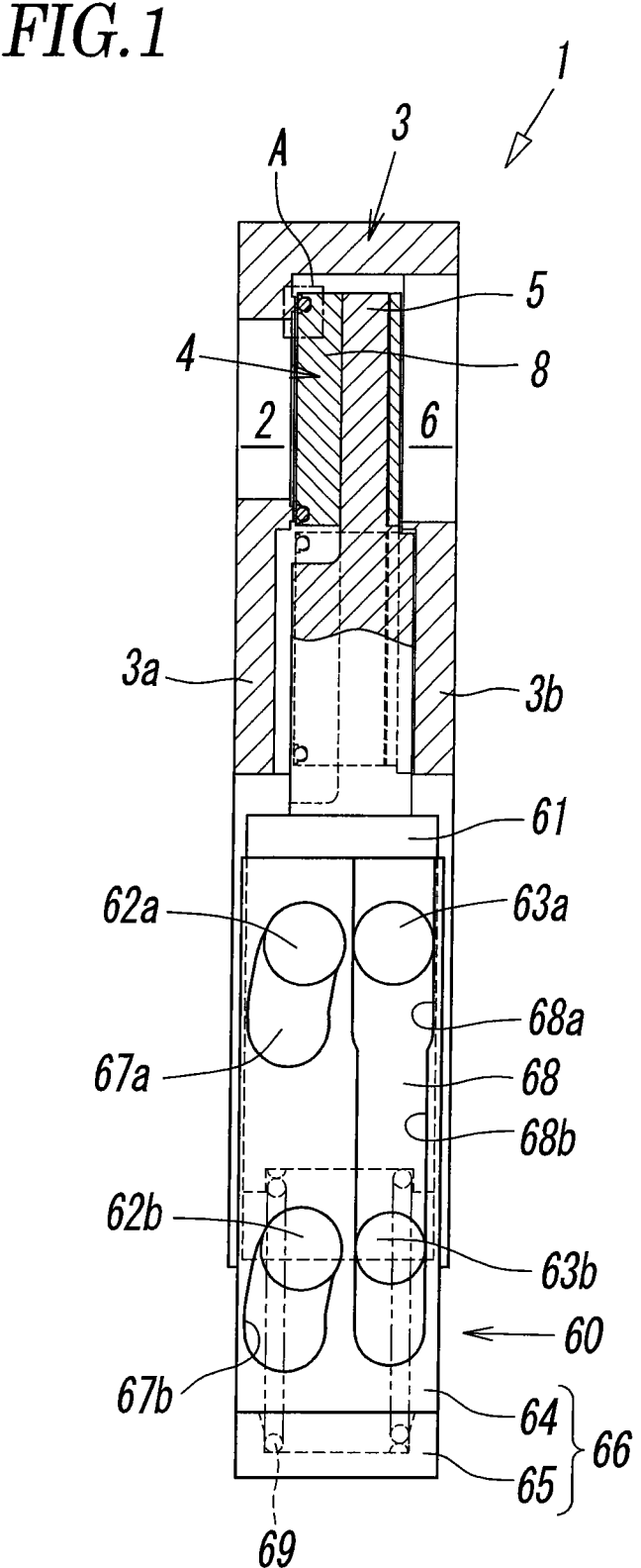
FIG. 1 is a schematic sectional view showing a state where, in a gate valve according to a first embodiment of the present invention, a valve plate is at an intermediate position where the valve plate is vertically separated from a gate opening.

A first embodiment of a gate valve according to the present invention will be described with reference to FIG. 1, FIG. 2, and FIGS. 3A and 3B. This gate valve 1 has a substantially rectangular parallelepiped-shaped hollow valve casing 3 provided with a gate opening 2 for connecting to a process chamber (not shown), a valve plate 4 disposed in the valve casing 3, a valve shaft 5 to the distal end of which is fixed the valve plate 4 and the proximal end of which extends through the valve casing 3 to the outside of the valve casing 3, and a valve moving mechanism 60 connected to the proximal end of the valve shaft 5 to move the valve plate to open and close the gate opening 2. By driving the valve moving mechanism 60 with a driving portion such as an air cylinder (not shown), the valve plate 4 can be reciprocated between a fully opening position shown by dashed line in FIG. 1 where the valve plate 4 fully opens the gate opening 2 and a hermetically closing position shown in FIG. 2 where the valve plate 4 hermetically closes the gate opening 2 through an intermediate position shown by solid line in FIG. 1 where the valve plate 4 is separated from and opposed to the gate opening 2.

The valve casing 3 has front and back first and second partition walls 3a and 3b opposed to each other. Of the partition walls, the first partition wall 3a is provided with the gate opening 2 having a horizontally elongated substantially rectangular shape, and the second partition wall 3b is provided with a back opening 6 similarly having a substantially rectangular shape at a position opposite the gate opening 2. An annular valve seat 7 is formed on the inner surface 3c of the first partition wall 3a so as to surround the gate opening 2.

On the other hand, the valve plate 4 has a valve plate body 8 that is formed in a substantially rectangular plate-like shape larger in vertical and horizontal dimensions than the gate opening 2 and that has a substantially flat seal surface 8a on the front side thereof opposite the gate opening 2, and an annular seal member 9 that is attached to the seal surface 8a of the valve plate body 8 and that comes into and out of contact with a valve seat surface 7a of the valve seat 7 with the movement of the valve plate 4 and thereby opens and closes the gate opening 2.

At this time, the valve plate body 8 has, at a position in the seal surface 8a thereof corresponding to the valve seat 7, an annular seal groove 10 for fitting and attaching the seal member 9, and is fixed, on the back side thereof opposite from the seal surface 8a, to the valve shaft 5 with an appropriate fastener (not shown).

The seal member 9 is integrally formed of an elastic body (elastomer) such as rubber, and has a uniform cross-section over the entire circumference thereof. Similarly, the seal groove 10 for fitting and attaching the seal member 9 also has a uniform cross-section over the entire circumference thereof.

The valve moving mechanism 60 has a block-like lever member 61 that is fixed to the proximal end of the valve shaft 5 outside the valve casing 3, a pair of left and right first and second cam rollers 62a and 62b that are fixed to both the left and right side surfaces of the lever member 61 and along the axis of the valve shaft 5, a pair of left and right first and second guide rollers 63a and 63b that are disposed along the axis of the valve shaft 5 and fixedly relative to the valve casing 3, and a cam frame 66 that are formed by connecting the ends of a pair of left and right cam plates 64 respectively opposed to the left and right side surfaces of the lever member with a connecting plate 65.

The cam plates 64 are provided with first and second cam grooves 67a and 67b for slidably fitting the first and second cam rollers 62a and 62b, respectively, and a guide groove 68 for slidably fitting the first and second guide rollers 63a and 63b.

At this time, the first and second cam grooves 67a and 67b are inclined toward the gate opening 2 side as they extend from the distal end side to the proximal end side of the valve shaft 5. On the other hand, the guide groove 68 is linear along the axis of the valve shaft 5, and is formed by a wide first guide groove portion 68a disposed on the distal end side thereof and a narrow second guide groove portion 68b continuously disposed on the proximal end side thereof. The first guide roller 63a is slidably fitted in the first guide groove portion 68a, and the second guide roller 63b is slidably fitted in the second guide groove portion 68b. Therefore, the first guide roller 63a is formed larger in diameter than the second guide roller 63b.

The connecting plate 65 of the cam frame 66 and the lever member 61 are connected by an elastic connecting member 69 such as a coil spring so as to be relatively movable in the axial direction of the valve shaft 5 (the vertical direction in the figure) and a direction perpendicular thereto (the horizontal direction in the figure). The connecting plate 65 of the cam frame 66 is connected to the driving portion (not shown) so that the cam frame 66 can be reciprocated along the axial direction of the valve shaft 5.

The operation of the gate valve will be described with reference to FIG. 1 and FIG. 2.

First, when, from a state where the valve plate 4 is at the intermediate position shown by solid line in FIG. 1, the cam frame 66 is moved in the proximal end direction of the valve shaft 5 (downward in the figure), the cam frame 66 also moves in the same direction while being guided by the guide rollers 63a and 63b and the guide groove 68. At that time, the lever member 61 connected to the cam frame 66 and fixed to the valve shaft 5 also moves integrally with the cam frame 66 in the same direction. Therefore, the positions of the cam rollers 62a and 62b in the cam grooves 67a and 67b are not changed. As a result, the valve plate 4 is displaced from the intermediate position, along the axis of the valve shaft 5, and in the same direction as the lever member 61, and moves to the fully opening position shown by dashed line in FIG. 1.

Figure 2:
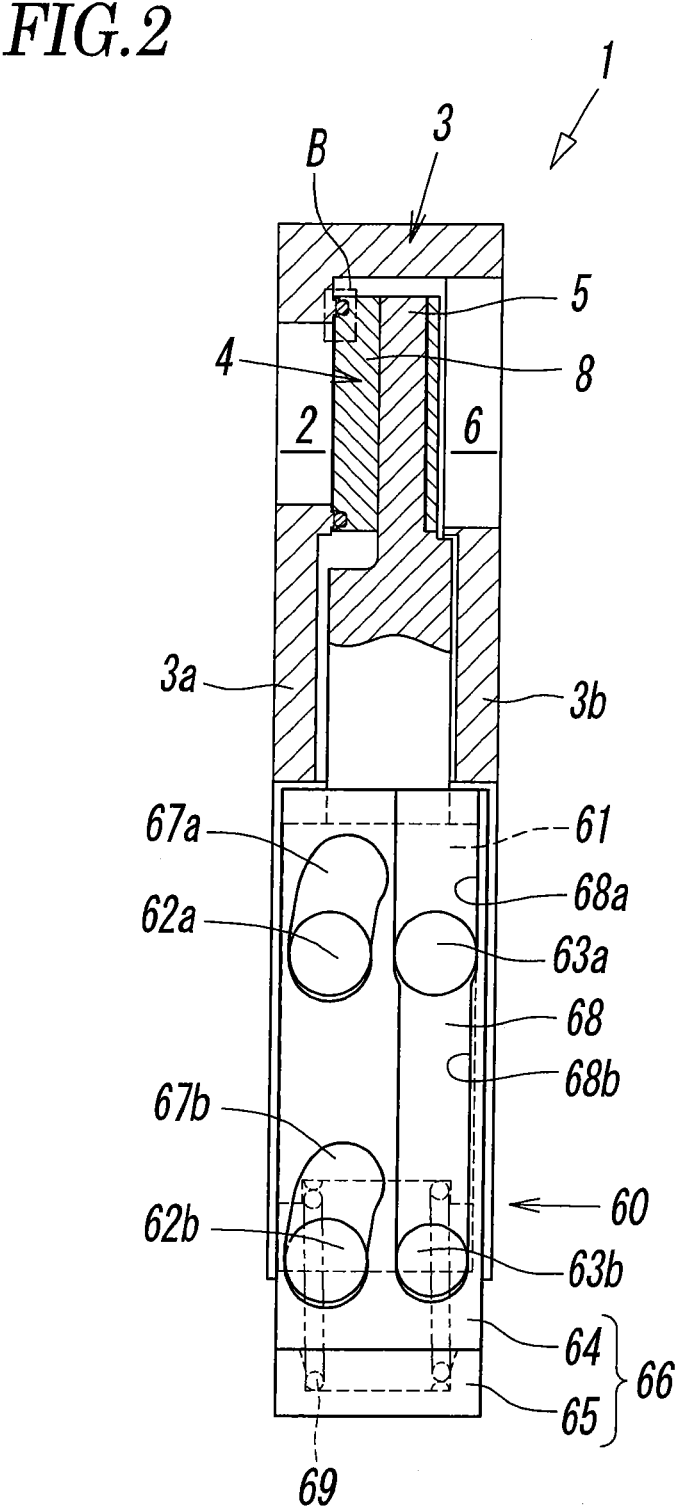
FIG. 2 is a schematic sectional view showing a state where, in the gate valve according to the first embodiment of the present invention, the valve plate is at a hermetically closing position where the valve plate hermetically closes the gate opening.

On the other hand, when, from a state where the valve plate 4 is at the intermediate position shown by solid line in FIG. 1, the cam frame is moved in the distal end direction of the valve shaft 5 (upward in the figure), in this intermediate position the lever member 61 is prevented from moving in the distal end direction of the valve shaft 5 by a stopper mechanism (not shown), therefore, as shown in FIG. 2, only the cam frame 66 moves in the distal end direction of the valve shaft 5 while compressing the elastic connecting member 69 disposed between itself and the lever member 61. At that time, together with the cam rollers 62a and 62b, the lever member 61 is displaced toward the gate opening 2 while being guided by the cam grooves 67a and 67b and inclining the elastic connecting member 69. As a result, the valve plate 4 is displaced perpendicularly to the axis of the valve shaft 5 toward the gate opening 2 side, the seal member 9 is pressed against the valve seat 7, and the gate opening 2 is thereby hermetically closed.

Now, as shown in FIGS. 3A and 3B, in the gate valve 1 according to the first embodiment, the seal groove 10 formed in the valve plate body 8 is formed by a first groove portion 11 that opens on the seal surface 8a of the valve plate body 8, and a second groove portion 12 that opens on the bottom wall 11a of the first groove portion 11.

The first groove portion 11 has a rectangular cross-section, a depth H1 from the opening thereof to the bottom wall 11a, and a uniform groove width W1 over the entire depth direction thereof.

However, in the present application, the term "rectangle" includes, within the technical common sense in design or manufacturing, those in which curved surfaces or tapered surfaces are formed at the corners thereof, and therefore, the groove width W1 is not required to have strict uniformity particularly in the boundary parts with the seal surface 8a and the bottom wall 11a.

On the other hand, the second groove portion 12 is provided substantially in the center in the width direction of the bottom wall 11a of the first groove portion 11, has an opening width W21 smaller than the groove width W1, and is formed in a dovetail groove shape that is symmetrical in the width direction. That is, the second groove portion 12 is formed such that the groove width thereof increases toward the depth direction and becomes the maximum width W22 substantially in the center in the depth direction thereof. Here, the depth H2 of the second groove portion 12 is larger than the depth H1 of the first groove portion 11, and the maximum width W22 of the second groove portion 12 is smaller than the groove width W1 of the first groove portion 11. However, the groove width W1 of the first groove portion 11 is preferably smaller than twice the opening width W21 of the second groove portion 12.

The seal member 9 is an O-ring having a circular cross-section, and is attached in such a state that the entirety thereof is housed in the seal groove. Specifically, the seal member 9 is attached in the second groove portion 12 in such a state that the outer peripheral surface thereof abuts against the bottom wall 12b of the second groove portion 12, and is engaged with opposed opening edges 12a of the second groove portion 12, and part thereof is protruded into the first groove portion 11. That is, in such an attached state, the surface of part of the seal member 9 that protrudes into the first groove portion 11 is formed so as to be a convex curved surface, and the thickness H3 of the seal member 9 is equal to the sum of the depths H1 and H2 of the first and second groove portions 11 and 12 (the depth of the seal groove) as shown in FIGS. 3A and 3B, or smaller than the sum and larger than the depth H2 of the second groove portion 12. The width W3 of the seal member is smaller than the maximum width W22 of the second groove portion 12 and larger than the opening width W21 thereof.

The valve seat 7 is protruded from a position on the inner surface 3c of the first partition wall 3a at a distance C from the opening edge 2a of the gate opening 2 vertically toward the valve plate 4 direction, and the cross-section thereof is formed in a rectangular shape having a width W4 and a height H4. That is, the valve seat 7 has a width W4 that is uniform in the height direction, and a height H4 that is uniform in the width direction, and the valve seat surface 7a with which the seal member 9 comes into and out of contact is formed so as to be a flat surface parallel to the seal surface 8a.

At this time, the center of the valve seat 7 corresponds to the center of the seal groove 10, and the width W4 of the valve seat 7 is formed smaller than the width W1 of the first groove portion of the seal groove 10.

Therefore, when the valve moving mechanism 60 is driven to displace the valve plate 4 from the intermediate position shown in FIG. 3A to the hermetically closing position shown in FIG. 3B, the valve seat 7 brings the valve seat surface 7a thereof into close contact with the seal member 9, and is inserted into the first groove portion 11 of the seal groove 10 while pressing and elastically deforming the seal member 9 into the second groove portion 12. In this hermetically closing state, a gap D is formed between the seal surface 8a of the valve plate body 8 and the inner surface 3c of the first partition wall 3a, the distal end part of the valve seat 7 is inserted in the first groove portion 11, and the valve seat surface 7a hermetically abuts against the seal member 9 in the first groove portion 11.

When, at this time, a straight line L1 in contact with both the opening edge 2a of the gate opening 2 and the surface of the valve seat 7 crosses the valve plate body 8 between these contact points 2a and 7b as shown by long dashed double-short dashed line in FIG. 3B or is in contact with the surface of the valve plate body 8, radicals R entering the space between the seal surface 8a of the valve plate body 8 and the inner surface 3c of the first partition wall 3a through the gate opening 2 can be prevented from directly reaching the seal member 9.

The height H4 of the valve seat 7 in this embodiment only has to be formed larger than the gap D plus the difference between the depth H1+H2 of the seal groove 10 and the height H3 of the seal member, that is, D+{(H1+H2)−H3}. The opening width W1 of the seal groove 10 is preferably smaller than or equal to twice the width W4 of the valve seat 7.

In such a hermetically closed state of the gate opening 2, the seal member 9 is surrounded by the seal groove 10 and the valve seat 7. Therefore, if radicals R enter the space between the seal surface 8a and the inner surface 3c of the first partition wall 3a through the gate opening 2, as shown by dashed line in FIG. 3B, most of the radicals R repeatedly collide with the seal surface 8a of the valve plate body 8, the inner surface 3c of the partition wall 3a, or the side surface of the valve seat 7 and are prevented from reaching the seal member 9. As a result, the deterioration of the seal member 9 due to radicals R can be suppressed.

At the same time, the entire seal member 9 is always housed in the seal groove 10, and, when hermetically closing the gate opening 2, the valve seat 7 brings the valve seat surface 7a thereof into close contact with the seal member 9, and is inserted into the first groove portion 11 of the seal groove 10 while pressing the seal member 9 into the second groove portion 12. Therefore, the seal member 9 can also be prevented from coming off the seal groove 10.

Next, a second embodiment of a gate valve according to the present invention will be described with reference to FIGS. 4A and 4B. The only difference between the gate valve according to the first embodiment and the gate valve according to the second embodiment is in their seal parts shown in FIGS. 3A and 3B and FIGS. 4A and 4B, and the basic configuration and operation of the second embodiment are the same as those of the first embodiment shown in FIG. 1 and FIG. 2, so the description will be omitted here. The same reference signs will be used to designate the same components as those of the seal part of the first embodiment shown in FIGS. 3A and 3B and the specific description thereof will be omitted here to avoid duplication.

In the gate valve according to the second embodiment, a seal groove 20 is formed of a single recessed groove that opens on a seal surface 8a of a valve plate body 8 opposed to a gate opening 2. The seal groove 20 has a rectangular cross-section, a depth H5 from the opening thereof to the bottom wall 20a, and a uniform groove width W5 over the entire depth direction thereof.

In the seal groove 20, there is attached a seal member 29 similarly having a rectangular cross-section, with the entirety of its side surfaces and bottom surface in close contact with the inner walls of the seal groove 20, and its top surface is formed so as to be a flat surface parallel to the seal surface 8a and is disposed in the seal groove 20. That is, the seal member 29 has, in its attached state, the same width as the groove width W5 of the seal groove. At this time, the thickness H6 from the top surface to the bottom surface of the seal member 29 is smaller than the depth H5 of the seal groove 20, and therefore, the entirety of the seal member 29 is housed in the seal groove 20. The seal member 29 is preferably formed slightly wider than the width of the seal groove 20 in order to improve the close contact with the inner surface of the seal groove 20.

On the other hand, a valve seat 27 is protruded from a position similar to that in the first embodiment vertically toward the valve plate 4, the cross-section thereof is formed so as to have a width W7 and a height H7, and a valve seat surface 27a that is located at the distal end thereof and that is opposed to the top surface of the seal member 29 is formed so as to be a convex curved surface. Specifically, the valve seat 27 is formed by a proximal portion 27b having a width W7 that is uniform in the height direction and having a rectangular cross-section, and a distal end portion 27c formed so as to be a convex curved surface that is highest in the center in the width direction.

At this time, the center of the valve seat 27 corresponds to the center of the seal groove 20, and the width W7 of the valve seat 27 is formed smaller than the width W5 of the seal groove 20. The height H7a of the proximal portion 27b of the valve seat 27 is preferably formed larger than a gap D in a hermetically closing state to be described later in detail.

Therefore, when the valve moving mechanism 60 is driven to displace the valve plate 4 from the intermediate position shown in FIG. 4A to a hermetically closing position shown in FIG. 4B, the valve seat 27 is inserted into the seal groove 20, brings the valve seat surface 27a thereof into close contact with the top surface of the seal member 29, and presses and elastically deforms the seal member 29 against the bottom wall 20a of the seal groove 20. In this hermetically closing state, as in the first embodiment, a gap D is formed between the seal surface 8a of the valve plate body 8 and the inner surface 3c of the first partition wall 3a, at least the distal end portion 27c of the valve seat 7 is inserted in the seal groove 20, and the valve seat surface 27a hermetically abuts against the seal member 29 in the seal groove 20.

When, at this time, as in the first embodiment, a straight line L2 in contact with both the opening edge 2a of the gate opening 2 and the surface of the valve seat 27 crosses the valve plate body 8 between these contact points 2a and 27b as shown by long dashed double-short dashed line in FIG. 4B or is in contact with the surface of the valve plate body 8, radicals R entering the space between the seal surface 8a of the valve plate body 8 and the inner surface 3c of the first partition wall 3a through the gate opening 2 can be prevented from directly reaching the seal member 9. It is more preferable that, instead of passing through the contact point 27b with the valve seat 27, this straight line L2 pass through the boundary between the proximal portion 27b and the distal end portion 27c of the valve seat 27.

The height H7 of the valve seat 27 in this embodiment only has to be formed larger than the gap D plus the difference between the depth H5 of the seal groove 20 and the height H6 of the seal member, that is, D+(H5−H6). The opening width W5 of the seal groove 20 is preferably smaller than or equal to twice the width W7 of the valve seat 27.

Also in such a hermetically closed state of the gate opening 2, as in the first embodiment, if radicals R enter the space between the seal surface 8a and the inner surface 3c of the first partition wall 3a through the gate opening 2, as shown by dashed line in FIG. 4B, most of the radicals R repeatedly collide with the seal surface 8a of the valve plate body 8, the inner surface 3c of the partition wall 3a, or the side surface of the valve seat 27 and are prevented from reaching the seal member 29. As a result, the deterioration of the seal member 29 due to radicals R can be suppressed.

At the same time, the entire seal member 29 is always housed in the seal groove 20, and, when hermetically closing the gate opening 2, the valve seat 27 is inserted with the distal end thereof first into the seal groove 20, brings the valve seat surface 27a thereof into close contact with the seal member 29, and presses the seal member 29 against the bottom wall 20a of the seal groove 20. Therefore, the seal member 29 can also be prevented from coming off the seal groove 20.

Although embodiments of the gate valve 1 according to the present invention have been described in detail above, the present invention is not limited to the above-described embodiments, and various design changes can be made without departing from the scope of the present invention.

REFERENCE SIGNS LIST

1: gate valve
2: gate opening
2a: opening edge (contact point)
3: valve casing
3a: first partition wall
3b: second partition wall
3c: inner surface
4: valve plate 5: valve shaft
7, 27: valve seat
7a, 27a: valve seat surface
7b, 27b: contact point
8: valve plate body
8a: seal surface
9, 29: seal member
10, 20: seal groove
20a: bottom wall
11: first groove portion
11a: bottom wall
12: second groove portion

The invention claimed is:

1. A radical-resistant gate valve comprising:
a gate opening provided in a partition wall in order to connect to a process chamber;
a valve plate coming into and out of contact with the gate opening in order to open and close the gate opening; and
a valve seat formed around the gate opening in the partition wall, the valve plate including a valve plate body having a seal groove at a position corresponding to the valve seat and a seal member attached in the seal groove,
wherein the seal groove is formed by a first groove portion that opens on a seal surface of the valve plate body opposed to the gate opening and that has a groove width that is uniform in a depth direction, and a dovetail groove-like second groove portion that opens substantially in a center of a bottom wall of the first groove portion and that has an opening width smaller than the groove width of the first groove portion,
wherein the seal member has a width larger than the opening width of the second groove portion and a thickness larger than a depth of the second groove portion, and is attached in the second groove portion in a state that a part of the seal member protrudes into the first groove portion,
wherein the valve seat is protruded from an inner surface of the partition wall toward a direction of the valve plate, has at a distal end thereof a valve seat surface with which the seal member is brought into and out of contact, and has a width smaller than an opening width of the seal groove, and
wherein when the valve plate is at a hermetically closing position of the gate opening, a distal end part of the valve seat is inserted in the seal groove, and the valve seat surface hermetically abuts against the seal member in the seal groove.

2. The gate valve according to claim 1,
wherein a surface of the part of the seal member that is protruded into the first groove portion is formed so as to be a convex curved surface, and the valve seat surface is formed so as to be a flat surface.

3. The gate valve according to claim 1,
wherein when the valve plate is at the hermetically closing position of the gate opening, a straight line in contact with both an opening edge of the gate opening on an inner side of the partition wall and the valve seat surface is in contact with the valve plate body or crosses the valve plate body between these contact points.

4. The gate valve according to claim 2,
wherein when the valve plate is at the hermetically closing position of the gate opening, a straight line in contact with both an opening edge of the gate opening on an inner side of the partition wall and the valve seat surface is in contact with the valve plate body or crosses the valve plate body between these contact points.

* * * * *